(12) United States Patent
Ji (10) Patent No.: US 9,787,125 B2
(45) Date of Patent: Oct. 10, 2017

(54) BATTERY MANAGEMENT SYSTEM AND METHOD OF DRIVING THE SAME

(71) Applicant: SAMSUNG SDI CO., LTD., Yongin-si, Gyeonggi-do (KR)

(72) Inventor: Se-Jin Ji, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 546 days.

(21) Appl. No.: 13/836,823

(22) Filed: Mar. 15, 2013

(65) Prior Publication Data

US 2014/0139176 A1 May 22, 2014

(30) Foreign Application Priority Data

Nov. 22, 2012 (KR) .......................... 10-2012-0133065

(51) Int. Cl.
*H02J 7/00* (2006.01)
*H02J 7/04* (2006.01)
*H02J 7/16* (2006.01)

(52) U.S. Cl.
CPC ........... *H02J 7/0081* (2013.01); *H02J 7/0073* (2013.01)

(58) Field of Classification Search
CPC ..................................................... Y02E 60/12
USPC ................. 320/148, 149, 151, 152, 156, 157
See application file for complete search history.

(56) References Cited

U.S. PATENT DOCUMENTS

| 5,929,598 A | * | 7/1999 | Nakama | H02J 7/025 320/108 |
| 8,742,729 B2 | * | 6/2014 | Wang | 320/137 |
| 2004/0257042 A1 | * | 12/2004 | Liu | H01M 10/441 320/130 |
| 2007/0077883 A1 | * | 4/2007 | Childers et al. | 455/3.05 |
| 2009/0128159 A1 | | 5/2009 | Nakatsuji | |
| 2010/0277294 A1 | * | 11/2010 | Tajima | 340/310.11 |
| 2010/0301813 A1 | * | 12/2010 | Esnard | H02J 7/0073 320/162 |
| 2010/0308775 A1 | | 12/2010 | Mizutani et al. | |
| 2011/0133701 A1 | * | 6/2011 | Li et al. | 320/153 |
| 2012/0069481 A1 | * | 3/2012 | Yamada | 361/93.7 |
| 2012/0112686 A1 | * | 5/2012 | Zhang | H02J 7/0026 320/107 |
| 2012/0112688 A1 | * | 5/2012 | Ho | 320/107 |

FOREIGN PATENT DOCUMENTS

| KR | 10-2008-0036412 A | 4/2008 |
| KR | 10-2009-0023547 A | 3/2009 |

* cited by examiner

*Primary Examiner* — Richard Isla Rodas
*Assistant Examiner* — Michael Dibenedetto
(74) *Attorney, Agent, or Firm* — Lee & Morse, P.C.

(57) ABSTRACT

A battery management system and a method of driving the same are provided. When the output signal of a charger is higher than a first voltage, a battery cell is charged with a first current by a first charge circuit. When the output signal of the charger is higher than a second voltage, a battery cell is charged with a second current by a second charge circuit. The second voltage is higher than the first voltage and second current is higher than the first current.

15 Claims, 6 Drawing Sheets

BATTERY MANAGEMENT SYSTEM AND METHOD OF DRIVING THE SAME

CROSS-REFERENCE TO RELATED APPLICATION

The present application claims priority under 35 U.S.C. §119 to Korean Patent Application No. 10-2012-0133065, filed on Nov. 22, 2012, in the Korean Intellectual Property Office, and entitled: "Battery Management System and Method of Driving the Same," which is incorporated by reference herein in its entirety.

BACKGROUND

1. Field

Embodiments relate to a battery management system and a method of driving the same.

2. Description of the Related Art

In today's rapidly changing information age, user demand for small, light weight, and high functioning information devices continues to increase. For enhanced portability, information devices, e.g., a personal digital assistant (PDA), a global positioning system (GPS), a camcorder, a laptop computer, a smart phone, and so forth, use a battery as a main power source. The battery charges electrical energy and supplies electrical energy to various electronic devices.

Most information devices use a rechargeable battery having a high energy density. In particular, most use a lithium rechargeable battery, which has a high energy density per unit weight and a fast charge speed as compared with other batteries, e.g., a lead storage battery, a nickel-cadmium battery, a nickel-hydrogen battery, and a nickel-zinc battery due. Such a rechargeable battery performs a charge operation as well as a discharge operation.

The above information disclosed in this Background section is only for enhancement of understanding of the background and, therefore, may contain information that does not form the prior art that is already known in this country to a person of ordinary skill in the art.

SUMMARY

One or more exemplary embodiments provide a battery management system. The battery management system includes a first charge circuit connected between a first terminal of a charger and a first terminal of a battery cell, wherein the first charge circuit controls charging the battery cell with a first current, a first switch having a first terminal connected to a second terminal of the battery cell, wherein the first switch switches charging of the battery cell by control of the first charge circuit, a second switch between a second terminal of the first switch and a second terminal of the charger, wherein the second switch switches charging of the battery cell to correspond to a value of an output signal of the charger, a second charge circuit connected between the first terminal of the charger and the first terminal of the battery cell, wherein the second charge circuit controls charging the battery cell with a second current, the second current being higher than the first current, a third switch having a first terminal connected to the second terminal of the battery cell, wherein the third switch switches charging of the battery cell by control of the second charge circuit, and a fourth switch between a second terminal of the third switch and the second terminal of the charger, wherein the fourth switch switches charging of the battery cell to correspond to a value of the output signal of the charger.

The second switch may be turned on when a value of the output signal of the charger is a first voltage. The fourth switch may be turned on when a value of the output signal of the charger is a second voltage higher than the first voltage.

The battery management system may include a first comparator that outputs a signal that turns on the second switch to the second switch when a value of the output signal of the charger is higher than the first voltage and a second comparator that outputs a signal that turns on the fourth switch when a value of the output signal of the charger is a second voltage higher than the first voltage.

The battery management system may include a first comparator that outputs a signal to turn on the fourth switch when a value of the output signal of the charger is higher than the first voltage and an inverter that inverts the output signal of the comparator and outputs a signal to the second switch.

A turn-on resistance of the third switch may be lower than a turn-on resistance of the first switch.

The first charge circuit may turn off the first switch when a charge current that is charged at the battery cell is higher than a first reference current. The second charge circuit may turn off the third switch when a charge current that is charged at the battery cell is higher than a second reference current. The second reference current may be higher than the first reference current.

The first charge circuit may measure the first current through a voltage between the first terminal and the second terminal of the first switch through the first charge circuit. The second charge circuit may measure the second current through a voltage between the first terminal and the second terminal of the third switch through the second charge circuit.

One or more exemplary embodiments provide a method of driving a battery management system that controls a charge operation from a charger to a battery cell. The method includes measuring an output signal of the charger, charging, when the output signal of the charger is higher than a first voltage, the battery cell with a first current, and charging, when the output signal of the charger is higher than a second voltage higher than the first voltage, the battery cell with a second current, the second current being higher than the first current.

Charging the battery cell with the first current may include, when the output signal of the charger is higher than the first voltage, turning on a first switch and a second switch, the first switch having a first terminal connected to the battery cell, and the second switch being between a second terminal of the first switch and the charger.

Charging the battery cell with the second current may include, when the output signal of the charger is higher than the second voltage, turning on a third switch and a fourth switch, the third switch having a first terminal connected to the battery cell, and the fourth switch being connected between a second terminal of the third switch and the charger.

A turn-on resistance of the third switch may be lower than that of the first switch.

Measuring the output signal of the charger may include comparing the output signal of the charger and the first voltage, and comparing the output signal of the charger and the second voltage.

The method may include measuring a value of the first current and, if the first current is higher than a first reference current, stopping charging, and measuring a value of the second current and, if the second current is higher than a second reference current, stopping charging.

The second reference current may be higher than the first reference current.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals designate like elements throughout the specification.

Throughout this specification and the claims that follow, when it is described that an element is "coupled" or "connected" to another element, the element may be "directly coupled" or "directly connected" to the other element or "electrically coupled" or "electrically connected" to the other element through a third element. In addition, unless explicitly described to the contrary, the word "comprise" and variations such as "comprises" or "comprising", will be understood to imply the inclusion of stated elements but not the exclusion of any other elements.

Hereinafter, a BMS and a method of driving the same according to exemplary embodiments will be described in detail with reference to the drawings.

Figure 1:
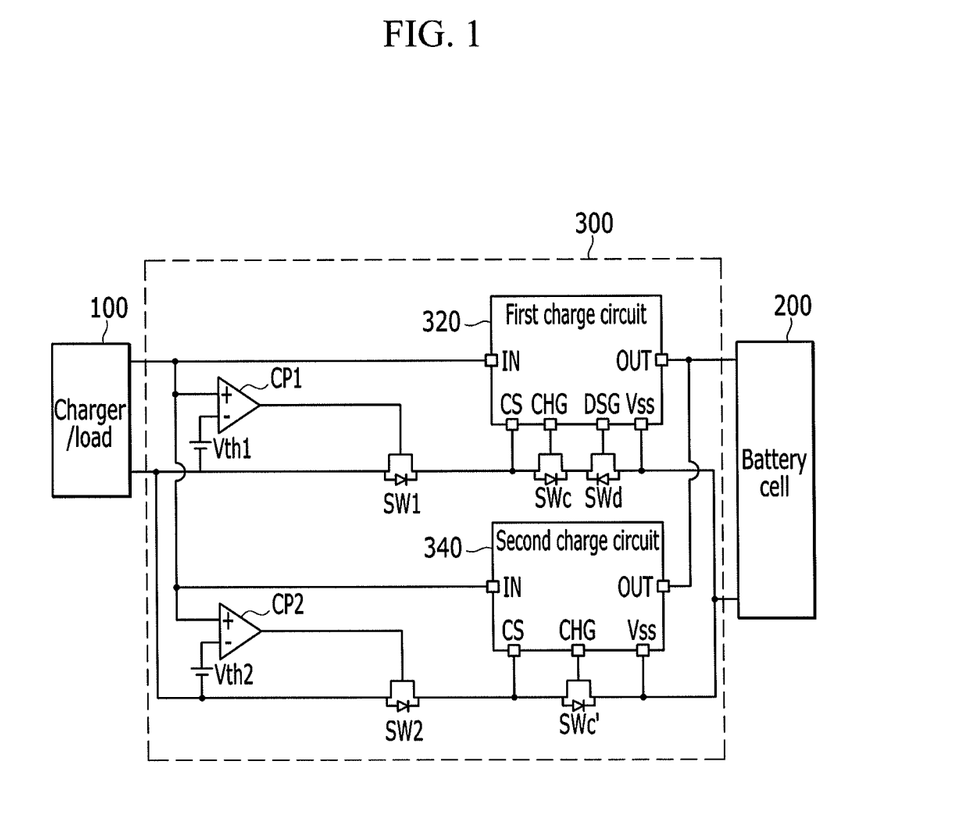
FIG. 1 illustrates a diagram of a battery management system ('BMS') and peripheral devices of the BMS according to an exemplary embodiment.

FIG. 1 illustrates a diagram of a BMS 300 and devices peripheral to the BMS 300 according to an exemplary embodiment. Devices peripheral to the BMS 300 include a charger/load 100 and a battery cell 200 that are connected to the BMS 300.

The battery cell 200 may include a plurality of cells coupled in series, each cell having a predetermined charge charged therein. The battery cell 200 according to an exemplary embodiment may be a rechargeable battery, and the BMS 300 controls charge and discharge operations of the battery cell 200. The battery cell 200 supplies charged charges through a discharge operation to various electronic devices, i.e., the load 100 and stores charges from the charger 100 through a charge operation.

When the battery cell 200 performs a charge operation, a charger of the charger/load 100 is connected to the BMS 300. When the battery cell 200 performs a discharge operation, a load, e.g., various electronic devices, of the charger/load 100 is connected to the BMS 300. The charger supplies charges to the battery cell 200 through the BMS 300 and the load receives supply of charges that are charged at the battery cell 200 through the BMS 300.

As shown in FIG. 1, the BMS 300 includes a first charge circuit 320, a first charge switch SWc, a first discharge switch SWd, a first comparator CP1, a first switch SW1, a second charge circuit 340, a second charge switch SWc', a second comparator CP2, and a second switch SW2.

The first charge circuit 320 controls charge and discharge of the battery cell 200 in a normal mode. The first charge circuit 320 includes an input terminal IN and an output terminal OUT. The input terminal IN of first charge circuit 320 is connected to a first end (i.e. terminal or pole) of the charger/load 100. The output terminal OUT of first charge circuit 320 is connected to a first end (i.e., terminal or pole) of the battery cell 200. A control terminal, i.e., a gate, of the first charge switch SWc is connected to a charge terminal CHG of the first charge circuit 320. A control terminal, i.e., a gate, of the first discharge switch SWd is connected to a discharge terminal DSG of the first charge circuit 320.

When performing a charge operation in a normal mode, the first charge circuit 320 turns on the first charge switch SWc through the charge terminal CHG. When performing a discharge operation in a normal mode, the first charge circuit 320 turns on the first discharge switch SWd through a discharge terminal DSG. That is, the first charge switch SWc and the first discharge switch SWd are back to back switches in which drains are connected to each other. The first charge switch SWc switches a charge operation and the first discharge switch SWd switches a discharge operation.

The first charge circuit 320 measures a voltage of a corresponding point through a ground terminal Vss and a sensing terminal CS, and measures a charge current Ic and a discharge current Id. When the measured charge current Ic is higher than a predetermined value, the first charge circuit 320 turns off the first charge switch SWc to protect the battery cell 200 from being overcharged. When the measured discharge current Id is higher than a predetermined value, the charge circuit 320 turns off the first discharge switch SWd to protect the load.

Figure 2:
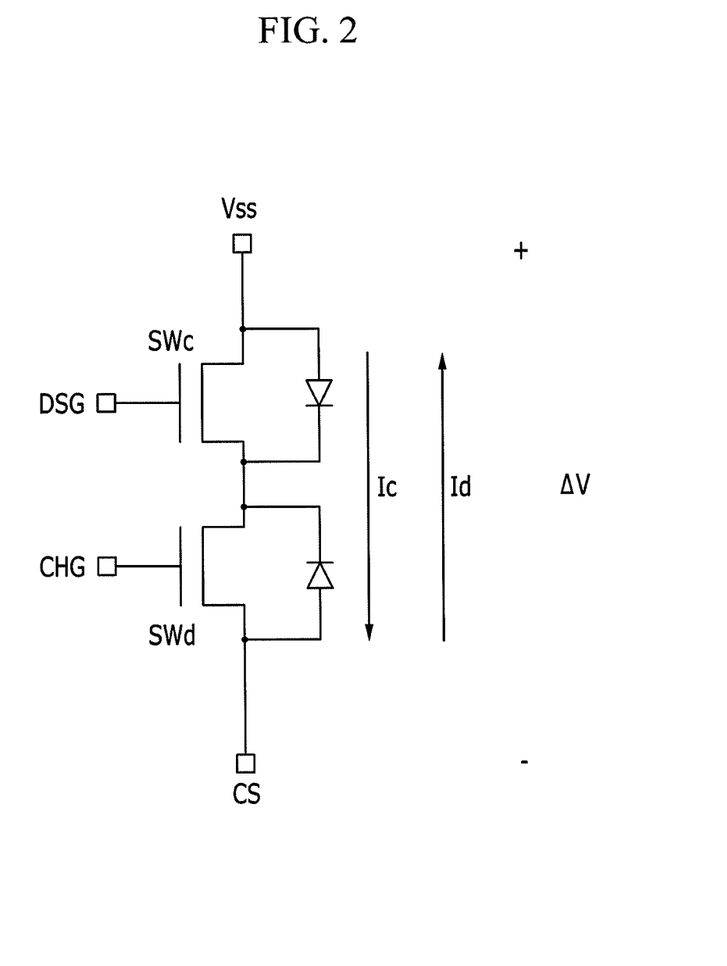
FIG. 2 illustrates a diagram of a method in which a first charge circuit measures a charge current and a discharge current according to an exemplary embodiment.

A method in which the first charge circuit 320 calculates the charge current Ic and the discharge current Id by measuring a voltage difference between the ground terminal Vss and the sensing terminal CS will be described with reference to FIG. 2. FIG. 2 illustrates a diagram of a method in which the first charge circuit 320 measures a charge current Ic and a discharge current Id according to an exemplary embodiment.

The first charge circuit 320 measures a second terminal (i.e., a source) voltage of the first discharge switch SWd through the ground terminal Vss and measures a second terminal (i.e., a source) voltage of the first charge switch SWc through the sensing terminal CS. The first charge circuit 320 calculates a difference $\Delta V$ between the measured voltage of the ground terminal Vss and the measured voltage of the sensing terminal CS, and calculates the charge current Ic according to Equation 1.

$$Ic = \Delta V / Ron \qquad \text{(Equation 1)}$$

Where Ron is a turn-on resistance of a switch in the current path, here, the first charge switch SWc, which is a known design parameter.

Similarly, the first charge circuit 320 measures a discharge current Id is obtained by calculating a difference ΔV between the measured voltage of the ground terminal Vss and the measured voltage of the sensing terminal CS, and calculating the charge current Ic according to Equation 1. When calculating the discharge current Id, using Equation 1, a turn-on resistance of the first discharge switch Swd is used as a Ron value.

Referring again to FIG. 1, a non-inversion terminal (+) of the first comparator CP1 is connected to the first end of the charger/load 100 and an inversion terminal (−) of the first comparator CP1 is connected to a first reference voltage Vth1. An output terminal of the first comparator CP1 is connected to a control terminal, i.e., a gate, of the first switch SW1. A first terminal, i.e., a drain, of the first switch SW1 is connected to the first charge switch SWc and a second terminal thereof, i.e., a source, is connected to a second end (i.e., terminal or pole) of the charger/load 100. When a voltage of a signal output at the first end of the charger/load 100 is higher than the first reference voltage Vth1, the first comparator CP1 outputs a high signal to the first switch SW1, thereby turning on the first switch SW1. When charge operation is in a normal mode, the first reference voltage Vth1 is determined in accordance with a voltage that is output by the charger of the charger/load 100. In this way, when the first switch SW1 is turned on, the battery cell 200 is charged in a normal mode by a charge operation under control of the first charge circuit 320.

The second charge circuit 340 controls charge of the battery cell 200 in an express mode. The second charge circuit 340 includes an input terminal IN and an output terminal OUT. The input terminal IN of the second charge circuit 340 is connected to the first end of the charger/load 100. The output terminal OUT of the second charge circuit 340 is connected to the first end of the battery cell 200. A control terminal, i.e., a gate, of the second charge switch SWc' is connected to a charge terminal CHG of the second charge circuit 340. When performing a charge operation in an express mode, the second charge circuit 340 turns on the second charge switch SWc' through the charge terminal CHG. A first terminal, i.e., a drain, of the second charge switch SWc' is connected to a second end (i.e., terminal or pole) of the battery cell 200 and a second terminal thereof, i.e., a source, is connected to a first terminal, i.e., a drain, of the second switch SW2. The second charge switch SWc' switches a charge operation in an express mode.

The second charge circuit 340 measures a voltage of a corresponding point through the ground terminal Vss and the sensing terminal CS, and calculates a charge current Ic'. When the calculated charge current Ic' is higher than a predetermined value, the second charge circuit 340 turns off the second charge switch SWc' to protect the battery cell 200. The predetermined current that triggers protection in the charge circuit 340 is set to be larger than the predetermined current in the first charge circuit 320. Therefore, when charging the battery cell 200 in an express mode, a charge operation is controlled through the second charge circuit 340, not the first charge circuit 320. Thus the battery cell 200 can be normally charged in an express mode.

Figure 3:
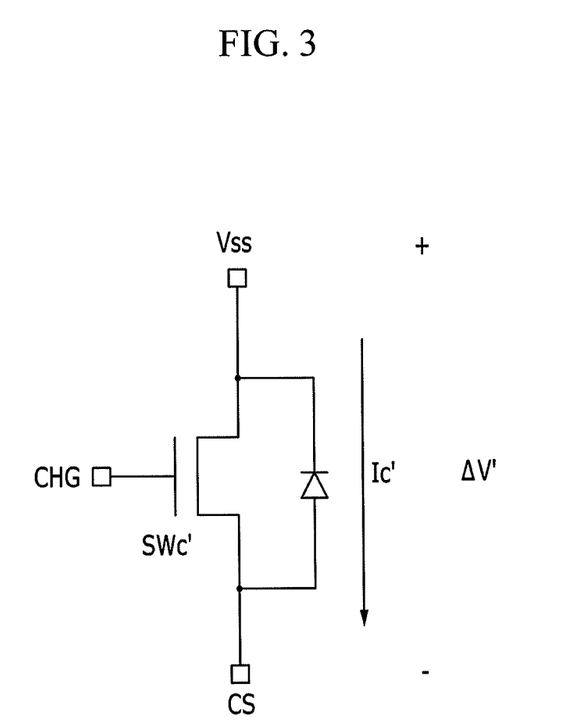
FIG. 3 illustrates a diagram of a method in which a second charge circuit measures a charge current according to an exemplary embodiment.

A method in which the second charge circuit 340 calculates the charge current Ic' by measuring a voltage difference between the ground terminal Vss and the sensing terminal CS will be described with reference to FIG. 3. FIG. 3 illustrates a diagram of a method in which a second charge circuit 340 measures a charge current Ic' according to an exemplary embodiment.

The second charge circuit 340 measures a first terminal (i.e., a drain) voltage of the second charge switch SWc' through the ground terminal Vss and measures a second terminal (i.e., a source) voltage of the second charge switch SWc' through the sensing terminal CS. The second charge circuit 340 calculates a difference ΔV between the measured voltage of the ground terminal Vss and the measured voltage of the sensing terminal CS, and calculates the charge current Ic' using Equation 2.

$$Ic'=\Delta V'/Ron' \qquad \text{(Equation 2)}$$

In Equation 2, Ron' is a turn-on resistance of the second charge switch SWc', which is a known design parameter. A value of Ron' is smaller than a Ron value in Equation 1. In an express mode, because a current higher than allowed in a normal mode flows, turn-on resistance of the second charge switch SWc' is set to a relatively small value.

A non-inversion terminal (+) of the second comparator CP2 is connected to the first end of the charger/load 100 and an inversion terminal (−) of the second comparator CP2 is connected to a second reference voltage Vth2. An output terminal of the second comparator CP2 is connected to a control terminal, i.e., a gate, of the second switch SW2. A first terminal, i.e., a drain, of the second switch SW2 is connected to a second terminal, i.e., a source, of a charge switch SWc', and a second terminal thereof, i.e., a source, is connected to the second end of the charger/load 100.

When a voltage of a signal that is output at one end of the charger/load 100 is higher than the second reference voltage Vth2, the second comparator CP2 outputs a high signal to the second switch SW2, thereby turning on the second switch SW2. When performing a charge operation in an express mode, the second reference voltage Vth2 is set in accordance with a voltage output at the charger/load 100, and the second comparator CP2 outputs a high signal in a charge operation of an express charge mode, thereby turning on the second switch SW2. In this way, when the second switch SW2 is turned on, the battery cell 200 is charged in an express mode by a charge operation control of the second charge circuit 340.

The second reference voltage Vth2 is set to be higher than the first reference voltage Vth1. In an express mode, in order to charge the battery cell 200 with a current higher than allowed in a normal mode, an output voltage of the charger/load 100 is high. Therefore, in an express mode, in order to charge the battery cell 200 by the control of the second charge circuit 340, the second reference voltage Vth2 is set higher than the first reference voltage Vth1.

Hereinafter, a method of charging a battery cell 200 when operating in a normal mode and a method of charging the battery cell 200 when operating in an express mode will be described with reference to FIGS. 4A and 4B.

Figure 4A:
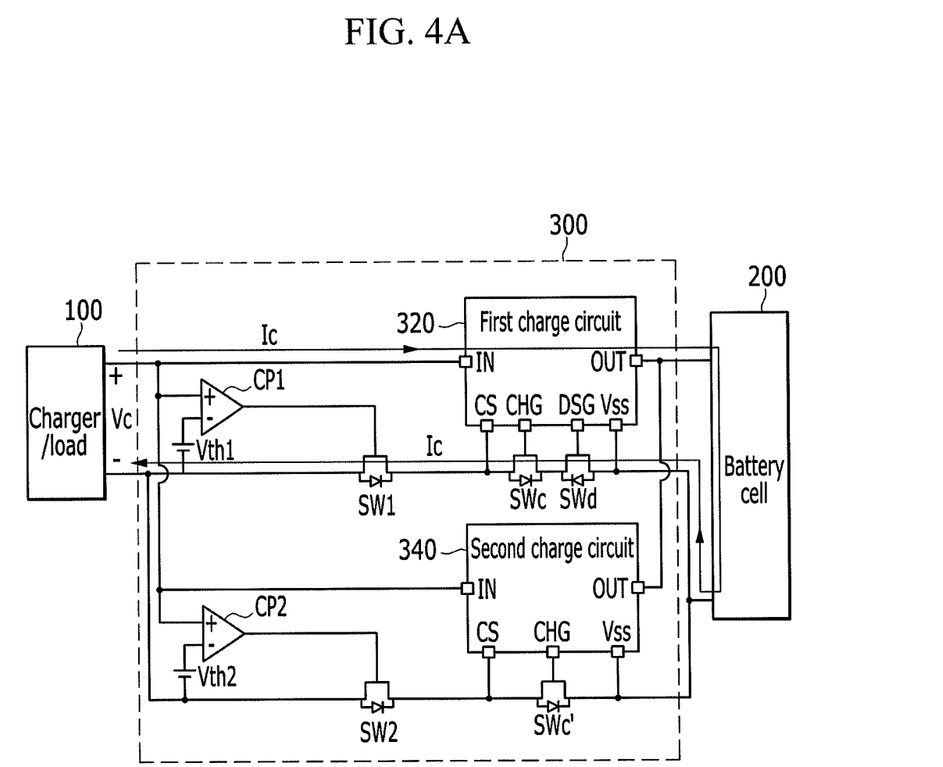
FIG. 4A illustrates a diagram of a method of charging a battery cell when a BMS operates in a normal mode according to an exemplary embodiment.

FIG. 4A illustrates a diagram of a method of charging the battery cell 200 when the BMS 300 operates in a normal mode according to an exemplary embodiment. When charging in a normal mode, a normal mode charge voltage Vc is output from the charger/load 100. Because the normal mode charge voltage Vc is higher than the first reference voltage Vth1, the first comparator CP1 outputs a high signal and thus the first switch SW1 is turned on. The first charge circuit 320 turns on the first charge switch SWc in a normal mode.

Accordingly, as shown in FIG. 4A, a current path of the charger/load 100, the first charge circuit 320, the battery cell 200, a body diode of the first discharge switch SWd, the first charge switch SWc, and the first switch SW1 is formed. That is, a normal mode charge current Ic is supplied from the charger 100 to the battery cell 200, and the battery cell 200 is charged.

Because the normal mode charge voltage Vc is lower than a second reference voltage Vth2, the second comparator CP2 outputs a low signal. Thus the second switch SW2 is turned off and a current path is not formed in the second charge circuit 340.

Figure 4B:
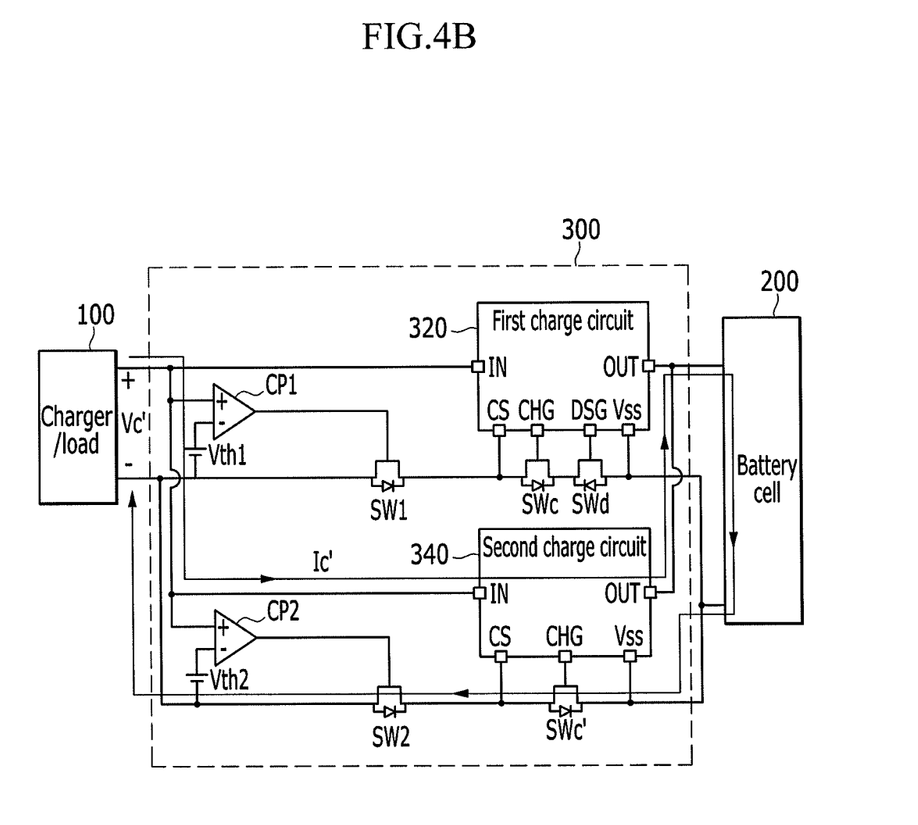
FIG. 4B illustrates a diagram of a method of charging a battery cell is charged when a BMS operates in an express mode according to an exemplary embodiment.

FIG. 4B illustrates a diagram of a method of charging the battery cell 200 when the BMS 300 operates in an express mode according to an exemplary embodiment.

When charging in an express mode, an express mode charge voltage Vc' is output from the charger/load 100. Because such an express mode charge voltage Vc' is higher than the second reference voltage Vth2, the second comparator CP2 outputs a high signal, turning on the second switch SW2. The second charge circuit 340 turns on the second charge switch SWc' in an express mode.

Accordingly, as shown in FIG. 4B, a current path of the charger/load 100, the second charge circuit 340, the battery cell 200, the second charge switch SWc', and the second switch SW2 is formed. That is, an express mode charge current Ic' is supplied from the charger 100 to the battery cell 200. Because the express mode charge voltage Vc' is higher than the first reference voltage Vth1, the first comparator CP1 outputs a high signal, turning on the first switch SW1. However, because the express mode charge current Ic' is higher than that allowed by the first charge circuit 320, the first charge circuit 320 turns off the first charge switch SWc, such that a current path is not formed in the first charge circuit 320.

In a normal mode, a signal corresponding to a normal mode, instead of the normal mode charge voltage Vc, may be output from the charger/load 100. In an express mode, a signal corresponding to an express mode, instead of the express mode charge voltage Vc', may be output from the charger/load 100. How to set the first reference voltage Vth1 and the second reference voltage Vth2 using such signals will be readily apparent to those of ordinary skill in the art.

In this way, according to an exemplary embodiment, even if a charge current is high in an express mode, a charge operation is controlled through the second charge circuit 340 and the battery cell 200 can be normally charged.

Figure 5:
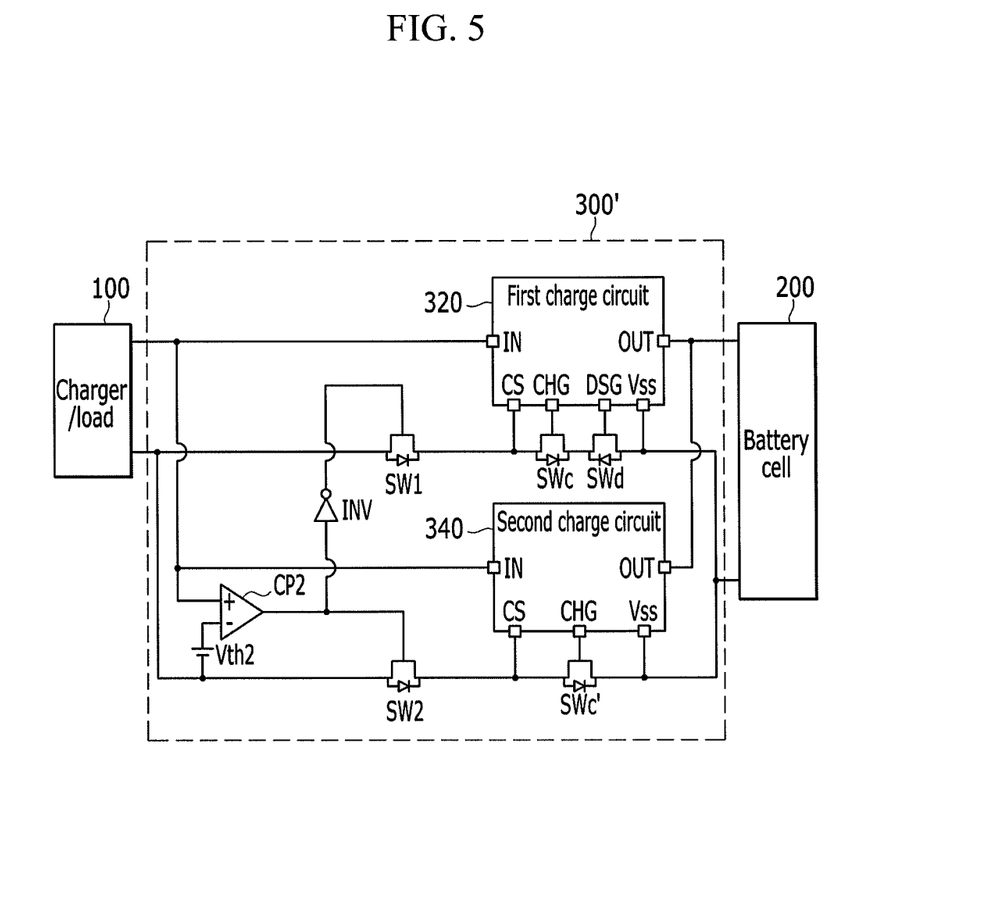
FIG. 5 illustrates a diagram of a BMS' and peripheral devices of the BMS' according to an exemplary embodiment.

FIG. 5 illustrates a diagram of a BMS 300' and peripheral devices of the BMS 300' according to an exemplary embodiment. As shown in FIG. 5, the BMS 300' is the same as the BMS 300, except that the comparator CP1 of the first exemplary embodiment is replaced with an inverter INV. In particular, the inverter INV is connected between an output terminal of the second comparator CP2 and a control terminal, i.e., a gate, of the first switch SW1.

When charging in a normal mode, a normal mode charge voltage Vc is output from the charger/load 100. Because a normal mode charge voltage Vc is lower than the second reference voltage Vth2, the second comparator CP2 outputs a low signal. Accordingly, the second switch SW2 is turned off, and a charge operation through the second charge circuit 340 does not occur.

When the second comparator CP2 outputs a low signal, an output of the inverter INV outputs a high signal, turning on the first switch SW1. When a first charge circuit 320 is in a normal mode, a first charge switch SWc is turned on.

Accordingly, as in FIG. 4A, a current path of the charger/load 100, the first charge circuit 320, a battery cell 200, a body diode of a first discharge switch SWd, the first charge switch SWc, and the first switch SW1 is formed. That is, a normal mode charge current Ic is supplied from the charger 100 to the battery cell 200 and thus the battery cell 200 is charged.

Next, when charging in an express mode, an express mode charge voltage Vc' is output from the charger/load 100. Because such an express mode charge voltage Vc' is higher than the second reference voltage Vth2, the second comparator CP2 outputs a high signal, turning on the second switch SW2. The second charge circuit 340 turns on a second charge switch SWc' in an express mode.

Accordingly, as in FIG. 4B, a current path of the charger/load 100, the second charge circuit 340, the battery cell 200, the second charge switch SWc', and the second switch SW2 is formed. That is, an express mode charge current Ic' is supplied from the charger 100 to the battery cell 200, and thus, the battery cell 200 is quickly charged.

Because an output of the second comparator CP2 is a high signal, an output of the inverter INV becomes a low signal. Accordingly, the first switch SW1 is turned off and, thus, a current path is not formed in the first charge circuit 320.

As noted above, in a normal mode, a signal corresponding to a normal mode, rather than a normal mode charge voltage Vc, may be output from the charger/load 100. In an express mode, a signal corresponding to an express mode, not an express mode charge voltage Vc', may be output from the charger/load 100. How to set the second reference voltage Vth2 using such signals will be readily apparent to those of ordinary skill in the art.

In this way, according to this exemplary embodiment, even if a large charge current is a lot in an express mode, because a charge operation is controlled through the second charge circuit 340, the battery cell 200 can be normally charged.

By way of summation and review, embodiments provide a battery management system and a method of driving the same that readily allow an express charge to be realized. In order to efficiently manage charge and discharge operations of a battery, a battery management system ('BMS') may be mounted in the rechargeable battery. According to embodiments, by providing a first current path through a first charge circuit during normal operation and a second current path through a second charge circuit during express operation, a battery cell may be quickly charged using a high current, while maintaining safer operation. According to exemplary embodiments, even if a large charge current is supplied in an express mode, a charge operation is controlled through an express mode charge circuit and, thus, a battery cell can be normally charged in an express mode.

In contrast, when performing a general charge operation of a battery, in order to prevent battery damage due to an overcurrent, a BMS may include a protective circuit that detects an overcurrent state when charging a battery and controls on/off of a charge operation. However, if a battery is protected based on a maximum current to be supplied during a normal mode, high currents to be supplied during an express charge may not be permitted.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery management system, comprising:
   a first charge circuit connected between a first terminal of a charger and a first terminal of a battery cell, wherein the first charge circuit controls charging the battery cell with a first current;
   a first switch having a first terminal connected to a second terminal of the battery cell, wherein the first switch switches charging of the battery cell by control of the first charge circuit;
   a second switch between a second terminal of the first switch and a second terminal of the charger, wherein the second switch switches charging of the battery cell to correspond to a value of an output signal of the charger;
   a second charge circuit connected between the first terminal of the charger and the first terminal of the battery cell, wherein the second charge circuit controls charging the battery cell with a second current, the second current being higher than the first current;
   a third switch having a first terminal connected to the second terminal of the battery cell, wherein the third switch switches charging of the battery cell by control of the second charge circuit; and
   a fourth switch between a second terminal of the third switch and the second terminal of the charger, wherein the fourth switch switches charging of the battery cell to correspond to a value of the output signal of the charger.

2. The battery management system as claimed in claim 1, wherein:
   the second switch is turned on when a value of the output signal of the charger is a first voltage, and
   the fourth switch is turned on when a value of the output signal of the charger is a second voltage higher than the first voltage.

3. The battery management system as claimed in claim 2, further comprising:
   a first comparator that outputs a signal that turns on the second switch when a value of the output signal of the charger is higher than the first voltage; and
   a second comparator that outputs a signal that turns on the fourth switch when a value of the output signal of the charger is the second voltage.

4. The battery management system as claimed in claim 2, further comprising:
   a first comparator that outputs a signal to turn on the fourth switch when a value of the output signal of the charger is higher than the first voltage; and
   an inverter that inverts the output signal of the comparator and outputs a signal to the second switch.

5. The battery management system as claimed in claim 1, wherein a turn-on resistance of the third switch is lower than a turn-on resistance of the first switch.

6. The battery management system as claimed in claim 1, wherein:
   the first charge circuit turns off the first switch when a charge current that is charged at the battery cell is higher than a first reference current,
   the second charge circuit turns off the third switch when a charge current that is charged at the battery cell is higher than a second reference current, and
   the second reference current is higher than the first reference current.

7. The battery management system as claimed in claim 5, wherein:
   the first charge circuit measures the first current through a voltage between the first terminal and the second terminal of the first switch and through the turn-on resistance of the first switch, and
   the second charge circuit measures the second current through a voltage between the first terminal and the second terminal of the third switch and through the turn-on resistance of the third switch.

8. A method of driving a battery management system that controls a charge operation from a charger to a battery cell by a battery management circuit, the battery management circuit including first and second charge current paths, the first and second charging current paths connected in parallel between the charger and the battery cell, the method comprising:
   measuring a charge voltage of the charger, the charge voltage to be supplied to the battery management circuit;
   charging, when the charge voltage of the charger is higher than a first voltage, the battery cell with a first current through the first charge current path of the battery management circuit; and
   charging, when the charge voltage of the charger is higher than a second voltage higher than the first voltage, the battery cell with a second current through the second charge current path of the battery management circuit, the second current being higher than the first current;
   wherein charging the battery cell with the first current includes, when the charge voltage of the charger is higher than the first voltage, turning on first and second switches of the battery management circuit, the first switch having a first terminal connected to a second terminal of the battery cell, and the second switch being between a second terminal of the first switch and a second terminal of the charger and
   wherein charging the battery cell with the second current includes, when the charge voltage of the charger is higher than the second voltage, turning on third and fourth switches of the battery management circuit, the third switch having a first terminal connected to the second terminal of the battery cell, and the fourth switch being connected between a second terminal of the third switch and the second terminal of the charger.

9. The method as claimed in claim 8, wherein a turn-on resistance of the third switch is lower than that of the first switch.

10. The method as claimed in claim 8, wherein measuring the charge voltage of the charger includes:
    comparing the charge voltage of the charger and the first voltage; and
    comparing the charge voltage of the charger and the second voltage.

11. The method as claimed in claim 8, further comprising:
    measuring a value of the first current and, if the first current is higher than a first reference current, stopping charging; and
    measuring a value of the second current and, if the second current is higher than a second reference current, stopping charging.

12. The method as claimed in claim 11, wherein the second reference current is higher than the first reference current.

13. The method as claimed in claim 8, wherein
    the battery management circuit includes first and second charge circuits connected in parallel between the charger and the battery cell, the first charge circuit connected between a first terminal of the charger and a first terminal of the battery cell, the second charge circuit connected between the first terminal of the charger and the first terminal of the battery cell.

14. The method as claimed in claim 13, wherein the charge voltage is supplied to the first terminals of the first and second charge circuits.

15. The method as claimed in claim 13, wherein:
charging the battery cell with the first current is performed by the first charge circuit, and
charging the battery cell with the second current is performed by the second charge circuit.

* * * * *